United States Patent
Hopkins et al.

(10) Patent No.: US 11,200,515 B1
(45) Date of Patent: Dec. 14, 2021

(54) AUTOMATED RELATIONSHIP MANAGEMENT BETWEEN CREATIVE ENTITIES AND VENUES

(71) Applicant: Amazon Technologies, Inc., Seattle, WA (US)

(72) Inventors: Joseph Hopkins, Seattle, WA (US); Richard Loser, Seattle, WA (US); Paul Kosmas Synadinos, Lynnwood, WA (US); Michael J. Johnson, Seattle, WA (US); Upneet Bhatia, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 696 days.

(21) Appl. No.: 15/927,615

(22) Filed: Mar. 21, 2018

(51) Int. Cl.
*G06Q 10/02* (2012.01)
*G06Q 20/10* (2012.01)
*G06Q 30/02* (2012.01)
*G06N 20/00* (2019.01)
*G06F 16/635* (2019.01)

(52) U.S. Cl.
CPC .............. *G06Q 10/02* (2013.01); *G06N 20/00* (2019.01); *G06Q 20/102* (2013.01); *G06Q 30/0201* (2013.01); *G06Q 30/0205* (2013.01); *G06F 16/637* (2019.01)

(58) Field of Classification Search
CPC ....................................................... G06Q 10/02
See application file for complete search history.

(56) References Cited

U.S. PATENT DOCUMENTS

| | | | |
|---|---|---|---|
| 2005/0038819 A1* | 2/2005 | Hicken | G06F 16/683 |
| 2013/0232435 A1* | 9/2013 | Knapp | H04L 12/1859 |
| | | | 715/771 |
| 2015/0088790 A1* | 3/2015 | Chidlovskii | G06N 20/10 |
| | | | 706/12 |

(Continued)

FOREIGN PATENT DOCUMENTS

WO WO-2009108641 A2 * 9/2009 ............. G06Q 30/06

OTHER PUBLICATIONS

Schippers, Marjolein, "Live Music Concert Attendees: Motivation, Satisfaction & Loyalty"; Jun. 2015; Erasmus University; retrieved from https://thesis.eur.nl/pub/32748/Schippers-Marjolein.pdf; attached (Year: 2015).*

*Primary Examiner* — Shannon S Campbell
*Assistant Examiner* — Bryan J Kirk
(74) *Attorney, Agent, or Firm* — Patterson + Sheridan, LLP

(57) ABSTRACT

Techniques for facilitating reservations between a first creative entity and a first venue. Digital audio data for a first creative entity is analyzed to determine acoustic attributes. A plurality of potential venues are determined. A machine learning model is used to calculate an estimated demand metric for the first creative entity for each of the plurality of potential venues, based on a venue profile for the respective venue and acoustic attributes for the first creative entity. Two or more venues are selected and a proposed itinerary is created. A digital order is generated based on the proposed itinerary. User profile data for the first creative entity is updated, upon successful completion of the digital order, and a digital transaction is generated to automatically charge a determined first amount to an account for the first venue and to transfer a determined second amount to an account for the first creative entity.

18 Claims, 9 Drawing Sheets

(56) References Cited

U.S. PATENT DOCUMENTS

| | | | |
|---|---|---|---|
| 2015/0302320 A1* | 10/2015 | Fiorentini | G06Q 50/10 705/5 |
| 2015/0358680 A1* | 12/2015 | Feldstein | H04N 21/478 725/43 |
| 2016/0019472 A1* | 1/2016 | Javit | G06Q 20/0855 705/5 |
| 2017/0213229 A1* | 7/2017 | Latin-Stoermer | G06F 16/9537 |
| 2017/0330209 A1* | 11/2017 | McGilliard | G06Q 30/0202 |
| 2019/0180297 A1* | 6/2019 | Bhatia | G06Q 30/0205 |

* cited by examiner

700

```
BEGIN
   │
   ▼
┌─────────────────────────────────────────────────────────────────────┐
│ GENERATE AN ENTITY PROFILE FOR A FIRST CREATIVE ENTITY, BASED ON A  │
│ PLURALITY OF ACOUSTIC ATTRIBUTES DETERMINED BY ANALYZING A PLURALITY│── 710
│ OF INSTANCES OF DIGITAL AUDIO DATA CORRESPONDING TO THE FIRST       │
│ CREATIVE ENTITY                                                     │
└─────────────────────────────────────────────────────────────────────┘
   │
   ▼
┌─────────────────────────────────────────────────────────────────────┐
│ TRAIN A MACHINE LEARNING MODEL USING DATA SPECIFYING ATTRIBUTES OF  │
│ A PLURALITY OF HISTORICAL VENUE BOOKINGS BY A PLURALITY OF OTHER    │
│ ENTITIES, WHEREIN AT LEAST ONE OF THE PLURALITY OF HISTORICAL VENUE │
│ BOOKINGS SPECIFIES A SECOND PLURALITY OF ACOUSTIC ATTRIBUTES FOR    │── 720
│ ONE OF THE OTHER ENTITIES AND A HISTORICAL DEMAND METRIC AT A FIRST │
│ VENUE, WHEREIN THE TRAINED MACHINE LEARNING MODEL IS CONFIGURED TO  │
│ OUTPUT AN ESTIMATED DEMAND METRIC FOR AN INPUT ENTITY AND AN INPUT  │
│ VENUE                                                               │
└─────────────────────────────────────────────────────────────────────┘
   │
   ▼
┌─────────────────────────────────────────────────────────────────────┐
│ CALCULATE, USING THE TRAINED MACHINE LEARNING MODEL, AN ESTIMATED   │
│ DEMAND METRIC FOR THE FIRST CREATIVE ENTITY FOR A FIRST VENUE,      │── 730
│ BASED ON THE ENTITY PROFILE FOR THE FIRST CREATIVE ENTITY AND A     │
│ FIRST VENUE PROFILE CORRESPONDING TO THE FIRST VENUE                │
└─────────────────────────────────────────────────────────────────────┘
   │
   ▼
┌─────────────────────────────────────────────────────────────────────┐
│ CREATE A DIGITAL TRANSACTION BETWEEN THE FIRST CREATIVE ENTITY AND  │── 740
│ THE FIRST VENUE                                                     │
└─────────────────────────────────────────────────────────────────────┘
   │
   ▼
  END
```

FIG. 7

AUTOMATED RELATIONSHIP MANAGEMENT BETWEEN CREATIVE ENTITIES AND VENUES

BACKGROUND

The present invention relates to online commerce, and more particularly, to techniques for using machine learning to analyze digital audio data for a creative entity to facilitate transactions between the creative entity and venues.

Currently the process of reserving venues for performances is a manual process that involves a number of different parties. For example, a creative entity seeking to schedule a tour across multiple venues may employ a manager, who deals with office managers, venue managers, financiers, ticket sellers, ticket resellers, merchandise vendors and so on. These various parties may each assess a fee for their services, which in some situations can add up to render a given booking financially impractical for the creative entity. Moreover, in many instances, the creative entity may not have the knowledge to select appropriate venues for their style of performance, especially in geographic regions the creative entity is unfamiliar with. Additionally, while a creative entity may be knowledgeable about a venue that is particularly well suited for the creative entity's material, the creative entity may not have the appropriate contacts to book the venue.

Conventional solutions have been created which provide a basic framework for facilitating communication between creative entities and venues. For example, such conventional solutions may provide an interface through which creative entities can view information about various venues. Moreover, the interface may allow for communications (e.g., instant messaging, electronic mail, etc.) between the creative entities and the venues. However, such solutions merely provide a framework that assists in the manual booking of venues by the creative entity and that is otherwise limited in the assistance it can provide to creative entities and venues.

BRIEF DESCRIPTION OF DRAWINGS

FIG. 7 is a flow diagram illustrating a method for using a machine learning model to calculate an estimated demand metric for a creative entity and a venue, according to one embodiment described herein.

DETAILED DESCRIPTION

Figure 1:
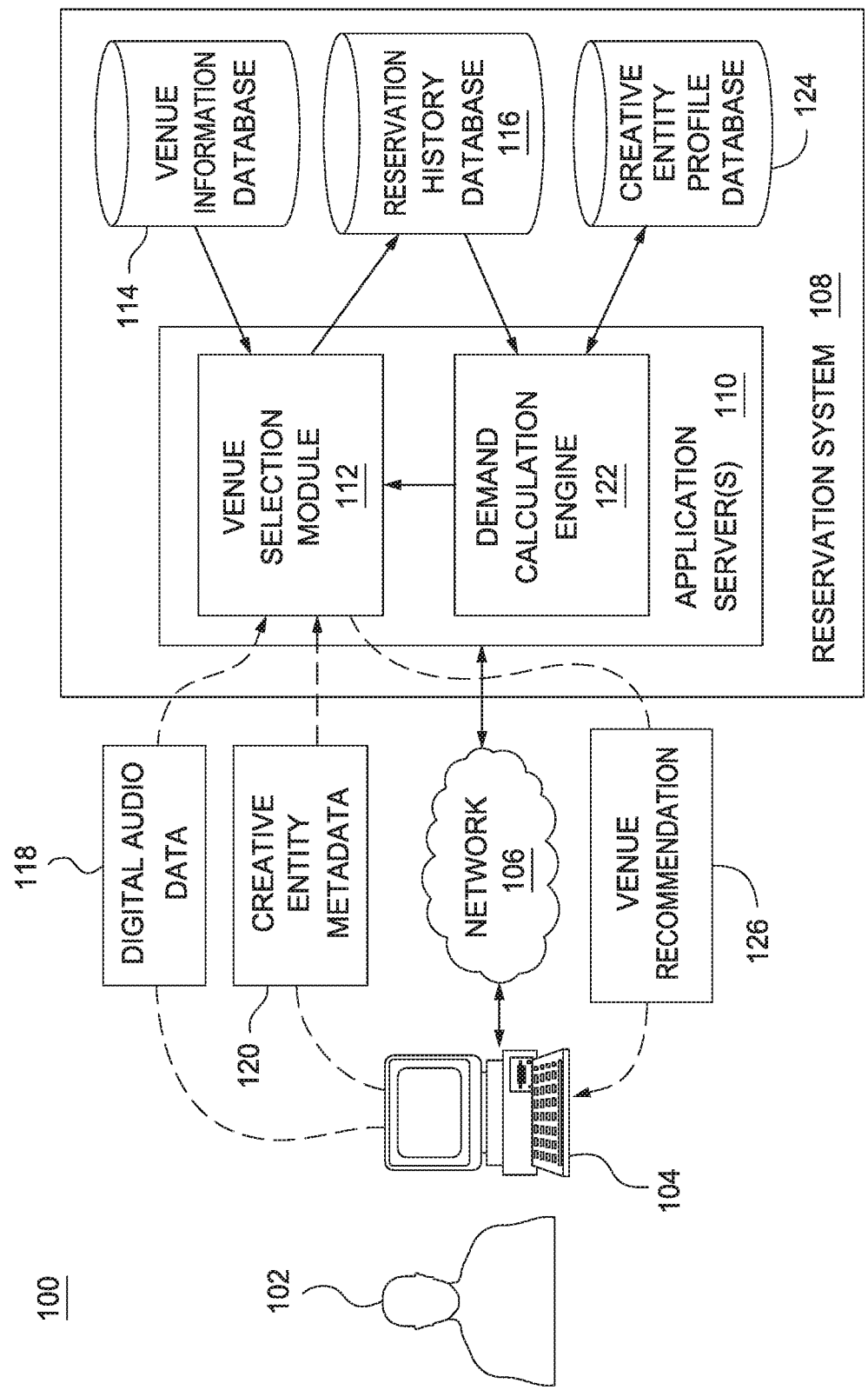
FIG. 1 is a block diagram illustrating a system and workflow for determining recommended venues for a creative entity, according to one embodiment described herein.

Conventionally, the process for creative entities (e.g., musicians, theatre troupes and the like) to book venues for performances is an entirely manual process. In many instances, this process involves a number of different parties, with many of these parties assessing a fee for their services. For example, to arrange a regional tour for a creative entity through conventional techniques, a band manager may begin by determining venues within the region (e.g., asking by word of mouth, performing a general online search, and so on). The band manager may then select venues that look promising and reach out to the managers of those venues, to inquire about availability, pricing and so on. In some circumstances, the creative entity may require additional funding to reserve a number of different venues for a tour, and thus one or more financiers may become involved in the process by providing capital for the tour in exchange for a return on their investment. Once the venues have been reserved, the band manager and/or venue manager may reach out to ticketing sellers and resellers to sell tickets for shows at the various venues. Moreover, merchandise manufacturers and sellers may become involved in the process, to create and sell merchandise associated with the creative entity at the various shows.

With each of these parties assessing a fee for their services, it can be difficult for newer creative entities to enter the market, as they simply may not have the capital, the connections and/or the management skills to manage such a complex arrangement. For example, a newer creative entity may struggle to even know who to contact to obtain tour financing or ticket selling services for their tour. In other instances, the creative entity may simply not have a sufficient reputation to obtain these various services, as some service providers may be hesitant to work with a relatively unknown creative entity.

While the aforementioned problems can have a significant effect on the creative entities seeking to reserve venues for performances, these situations can negatively affect the venues as well. For example, a particular creative entity may be an ideal match for a given venue and performances by the creative entity at the particular venue may be very successful. However, due to a lack of communication between the particular creative entity and the venue (e.g., due to the parties not knowing of each other or how to contact each other) or, as another example, due to the venue having reservations about working with the creative entity due to being unfamiliar with the creative entity, such a successful venture may ultimately never take place, even though it would potentially benefit all the involved parties.

While many technological tools are available for communicating with others, including electronic mail (e-mail), instant messaging, SMS messaging, social media sites and the like, these tools do not address many of the aforementioned problems. For example, even though a user associated with a creative entity may reach out to a particular venue using email, the venue manager may still be reluctant to work with the creative entity, e.g., due to being unfamiliar with the creative entity and unsure as to whether a performance by the creative entity at the venue would be successful.

As such, it is apparent that basic communications tools are insufficient to address the aforementioned problems, and conventional or generic technical solutions to this problem fail as well, as these solutions merely provide a framework through which users can manually interact with one another. Accordingly, embodiments described herein provide techniques for addressing the technical problem of providing a comprehensive system for connecting creative entities with venues and managing the relationship between these parties. As described herein, particular embodiments can automatically generate ticket objects that correspond to tickets to a particular show by a particular creative entity at a particular venue, and can further dynamically generate product pages on a retail site through which these tickets can be sold.

FIG. 1 is a block diagram illustrating a system and workflow for determining recommended venues for a creative entity, according to one embodiment described herein. Generally, FIG. 1 and the following description are intended to provide a brief, general description of a suitable computing environment in which the embodiments described herein may be implemented. In particular, FIG. 1 is a system and network diagram that shows an illustrative operating environment 100 including several software components for managing relationships and transactions between creative entities and venues.

The environment 100 includes a user 102 that uses a client device 104 to access a reservation system 108 across a network 106. The user 102 may be an individual or entity that desires to create, using the reservation system 108, an itinerary for a creative entity for performing at one or more venues. The client device 104 may be a personal computer ("PC"), a desktop workstation, a laptop, a tablet computer, a notebook, a personal digital assistant ("PDA"), an electronic-book reader, a game console, a set-top box, a consumer electronics device, a server computer, or any other computing device capable of connecting to the network 106 and communicating with the reservation system 108.

The network 106 may be a local-area network ("LAN"), a wide-area network ("WAN"), the Internet, or any other networking topology known in the art that connects the client device 104 to the reservation system 108. The reservation system 108 may include a number of application servers 110 that provide various online reservation management services to the client device 104 over the network 106. The user 102 may use a client application executing on the client device 104 to access and utilize the online reservation services provided by the application servers 110.

In one embodiment the client application is a web browser application. Generally, such a web browser application can exchange data with the application servers 110 in the reservation system 108 using the hypertext transfer protocol ("HTTP") over the network 106. The client application could also be a stand-alone client application (e.g., a mobile application) configured for communicating with the application servers 110. The client application might also utilize any number of communication methods known in the art to communicate with the reservation system 108 and/or the application servers 110 across the network 106, including remote procedure calls, SOAP-based web services, remote file access, proprietary client-server architectures, and the like.

The application servers 110 may execute a number of modules to provide reservation management services to the client device 104. The modules may execute on a single application server 110 or in parallel across multiple application servers in the reservation system 108. In addition, each module may consist of a number of subcomponents executing on different application servers 110 or other computing devices in the reservation system 108. The modules may be implemented as software, hardware, or any combination of the two.

As shown, the venue selection module 112 receives digital audio data 118 and creative entity metadata 120 from the client device 104. The digital audio data 118 represents one or more instances of digital audio data (e.g., encoded digital audio files) that correspond to a particular creative entity. For example, the user 102 could be affiliated with the particular creative entity (e.g., the user could be a band member, a band manager, etc. for the creative entity) and could upload digital audio files containing music recorded or created by the creative entity for analysis. Additionally, the user 102 could interact with a graphical user interface provided by the client application on the client device 104 to generate the creative entity metadata 120 describing the creative entity. For example, the client application could render a web page or other web resource received from the application server(s) 110 over the network 106, and the user 102 could use one or more input/output devices of the client device 104 to interact with elements on the rendered page to specify the creative entity metadata 120. Such metadata could include, for example, a musical genre associated with the creative entity, a musical sub-genre associated with the creative entity, instruments played by a member(s) of the creative entity, and so on.

In one embodiment, the user 102 can select one or more other creative entities that the user considers similar to the particular creative entity within the interface displayed by the client application. These selections could be transmitted o the venue selection module 112 as part of the creative entity metadata 120, and the venue selection module 112 could determine acoustic attributes corresponding to the other creative entity and could use these attributes in characterizing the particular creative entity and the digital audio data 118.

In one embodiment, the venue selection module 112 analyzes the plurality of instances of digital audio data 118 for the creative entity to determine a plurality of acoustic attributes that describe the digital audio data 118. For example, the user 102 could interact with a graphical user interface displayed on the client application on the client device 104 to upload a plurality of instances of digital audio data corresponding to recordings of the creative entity's songs for analysis by the venue selection module 112 using the network 106. The venue selection module 112 on the application server(s) 110 could then analyze the digital audio data 118 to determine the acoustic attributes describing the audio data. Such acoustic attributes could include, without limitation, a measure of tempo, a time signature, a key, a genre, a listing of instruments used in the recording, and so on. Generally, any audio analysis technique capable of determining attributes of an instance of digital audio data can be used, consistent with the functionality described herein. Advantageously, by performing an automated analysis of the digital audio data, embodiments can in some circumstances better ensure the accuracy of the acoustic attribute information.

In one embodiment, the venue selection module 112 can correlate the results of the automated analysis with other acoustic attributes associated with the creative entity metadata 120. In doing so, the venue selection module 112 may determine a confidence value corresponding to each acoustic attribute, and the venue selection module 112 can weigh the various attributes relative to one another based on these confidence values. For example, if both the automatically determined attributes and the manually specified attributes indicate that the genre for a particular creative entity's music is "jazz fusion", the venue selection module 112 could determine that the genre attribute has a relatively high confidence value. As another example, if the manually specified attributes indicate that the creative entity's music generally has a traditional rhythmic style but the automated analysis indicates that the instances of audio data generally have a swing rhythm, the venue selection module 112 could assign a relatively lower weight to the rhythmic structure attribute. Of course, these examples are provided for illustrative purposes only and without limitation, and more generally any type of acoustic attribute and weighting scheme can be used, consistent with the functionality described herein.

The venue selection module 112 could then retrieve, for each of a plurality of potential venues within a desired geographic region, a venue profile from a venue information database 114. Such a venue profile could specify, for example, the size of the venue, a type of the venue (e.g., a club, a coffee shop, a wine bar, a coliseum, an amphitheater, etc.) and more generally any attribute that describes an aspect of a venue. The venue selection module 112 can also retrieve a reservation history profile for the venue from a reservation history database 116. Such a reservation history profile can include a plurality of entities that previously performed at the potential venue and sales information for each of the previous performances. The venue selection module 112 could further retrieve a creative entity profile for each of the plurality of entities that previously performed at the potential venue, specifying acoustic attributes describing content created by the entity.

For each of the plurality of potential venues, the venue selection module 112 can execute a demand calculation engine 122 to generate an estimated demand metric for the first creative entity, based on the venue profile for the respective venue and the plurality of acoustic attributes for the first creative entity. In one embodiment, the demand calculation engine 122 considers a variety of information describing users that frequent the respective venue, including (without limitation) the users' browsing history on a retail site, the users' purchase history on the retail site, the users' music consumption patterns (e.g., through streaming channels, through retail channels, etc.), the users' social media postings, and so on. More generally, any information that users have authorized the demand calculation engine 122 to access can be considered, consistent with the functionality described herein.

The venue selection module 112 could then select two or more of the plurality of potential venues for inclusion on a proposed tour for the first creative entity, based on the estimated demand metrics. The venue selection module 112 could create a proposed itinerary based on the two or more potential venues, wherein the proposed itinerary includes at least a scheduled date and time for each of two or more selected venues.

The venue selection module 112 can then generate a digital order based on the proposed itinerary, based on a determined aggregate cost for the proposed itinerary, where the aggregate cost is calculated based on a determined cost of reserving each of the two or more selected venues, based on the venue profiles corresponding to the respective selected venue. In one embodiment, the venue selection module 112 can generate an interface for display using the client application on the client device 104, depicting the cost for the proposed itinerary and confirming a method of payment for any initial costs to reserve the venues. Upon successful completion of the digital order (e.g., upon acceptance of the order within the graphical user interface and/or upon authorizing payment for the order and such payment being processed successfully), the venue selection module 112 could update user profile data for the first creative entity to include the proposed itinerary.

Upon receiving an indication that a first performance by the first creative entity was completed at a first venue of the two or more selected venues, the venue selection module 112 can generate a digital transaction to automatically transfer a determined first amount to an account for the first creative entity. In one embodiment, the venue selection module 112 can be configured to deduct an agreed upon amount from the revenue resulting from the ticket sales for the first performance, and the remaining balance (after any other agreed upon fees are deducted) can represent the first amount that is credited to the account for the first creative entity.

Figure 2:
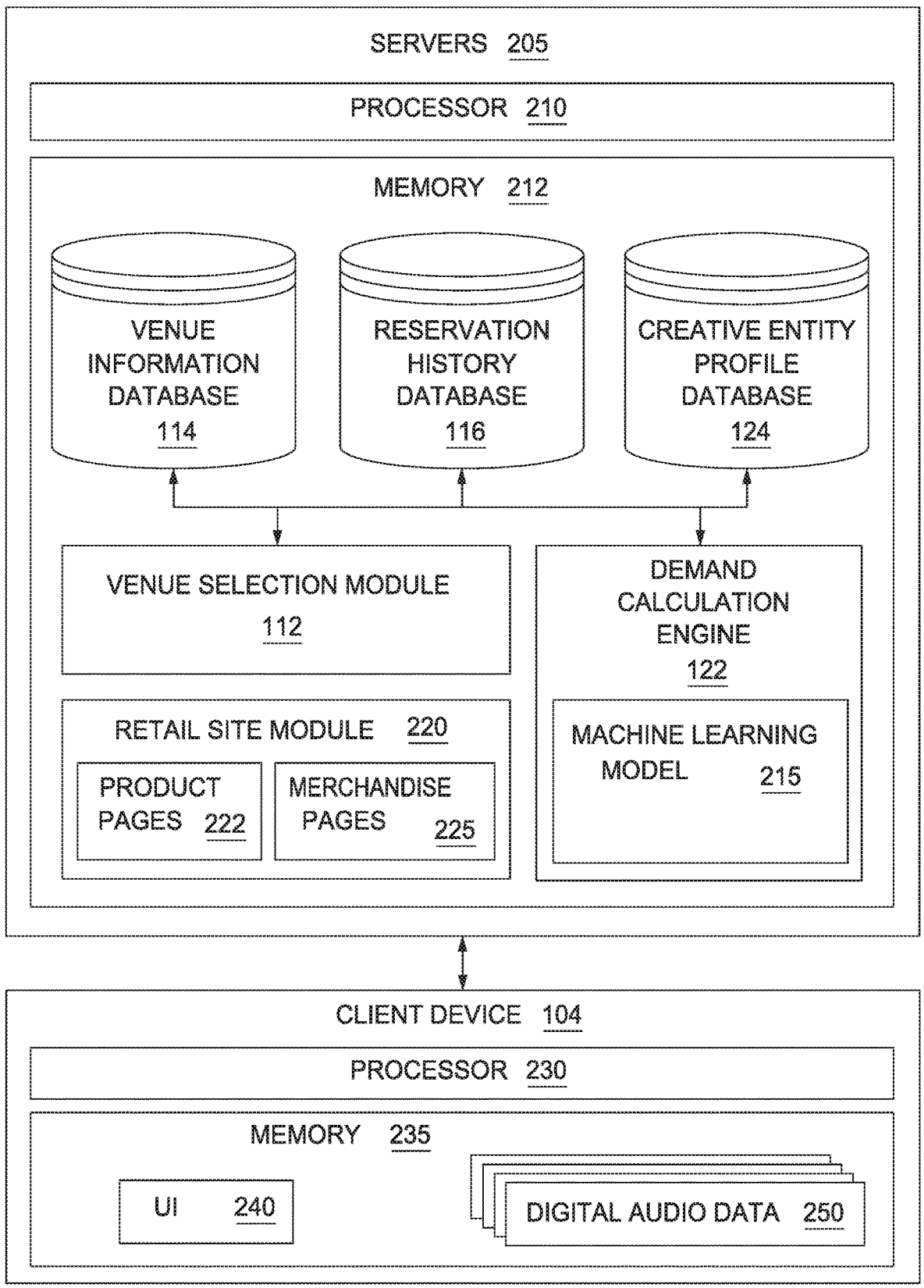
FIG. 2 is a block diagram illustrating a system configured with a venue selection module, according to one embodiment described herein.

FIG. 2 is a block diagram illustrating a system configured with a venue selection module, according to one embodiment described herein. As shown, the system 200 includes servers 205, which collectively provide processing capabilities 210 and memory 212. The memory 212 may include volatile and nonvolatile memory and/or removable and non-removable media implemented in any type or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems or any other medium which can be used to store the desired information and which can be accessed by a computing device.

Stored in the memory 212 are multiple data stores, including a venue database 114, a creative entity profile database 124 and a reservation history database 116. The venue database 114 maintains data for venues across one or more geographic regions. The creative entity profile database 124 maintains a catalog of creative entities, as well as attributes and metadata describing the creative entities. The reservation history database 116 stores data pertaining to previous reservations at the venues specified within the venue database 114, by creative entities specified within the creative entity profile database 124. The reservation history database 116 may also contain information describing each of these reservations, including a number of tickets sold for each reservation, the cost per ticket, the number of patrons attending the event at the venue, and so on.

The client device 104 has a processor 230 and memory 235 (e.g., volatile, non-volatile, etc.). A user interface (UI) 240 is stored in the memory 235 and executed on the processor 230 to allow the client device 104 to access the servers 205 of service 106 and request various content items. In one implementation, the UI 240 corresponds to the client application described above. For example, the UI 240 could be provided by a web browser or other application that renders pages or content served by the servers 205.

In one embodiment, the venue selection module 112 is configured to provide a graphical user interface through which a first creative entity can specify a plurality of acoustic attributes describing content created by the first creative entity. For example, the venue selection module 112 could generate or otherwise provide a web page or web resource to the client device 104, which the client device 104 could render to generate the UI 240. A user could use an input device of the client device 104 to specify the plurality of acoustic attributes within the UI 240, and the client device 104 could transmit this information to the venue selection module 112.

The venue selection module 112 could then receive location information specifying one or more desired geographic regions. Similarly, the one or more desired geographic regions could be specified within the UI 240 on the client device and transmitted to the venue selection module 112 (e.g., using a data communications network). Upon receiving the desired geographic regions, the venue selection module 112 can determine a plurality of potential venues within the one or more desired geographic regions by querying the venue database 114. Additionally, the venue selection module 112 could retrieve a reservation history profile for each of the plurality of potential venues from the reservation history database 116. For example, the reservation history profile could specify acoustic attributes for a plurality of entities that previously performed at the potential venue and further specifying, for each of two or more historical performances, an observed demand metric.

The venue selection module 112 could select a first venue from the plurality of potential venues, based on the plurality of acoustic attributes describing the content created by the first creative entity and the reservation history profile for the plurality of potential venues. The venue selection module 112 could create a digital order for reserving the first venue at a determined date and time for the first creative entity. For example, the venue selection module 112 could generate a digital order, based on a determined cost for reserving the first venue determined based on the first venue profile and could update user profile data for the first creative entity, upon successful completion of the digital order. Additionally, upon subsequently receiving an indication that a first performance by the first creative entity was completed at the first venue, the venue selection module 112 could automatically generate a digital transaction to charge a determined first amount to a digital account for the first venue and to transfer a determined second amount to a digital account for the first creative entity.

In selecting the first venue, the venue selection module 112 could execute the demand calculate engine 122 to analyze the collected venue and creative entity information and to calculate the estimated demand metric for a given pairing of a creative entity and a venue. In the depicted embodiment, the demand calculate engine 122 is configured to use a machine learning model 215 to analyze the collected information and to calculate the estimated demand metric. For example, the demand calculate engine 122 could train the machine learning model 215 using data specifying attributes of a plurality of historical venue bookings by a plurality of other entities retrieved from the reservation history database 116. The demand calculate engine 122 could further consider a second plurality of acoustic attributes for one of the other entities in one of these historical venue bookings, as well as a historical demand metric at a first venue for the historical venue booking. Generally, the trained machine learning model 215 may be configured to output an estimated demand metric, based on at least an input creative entity and an input venue.

Accordingly, the demand calculate engine 122 could calculate, using the machine learning model 215, an estimated demand metric for the first creative entity for a first venue, based on the entity profile for the first creative entity and a first venue profile corresponding to the first venue. The estimated demand metric could then be used to select between the potential venues within the geographic region. For example, the demand calculate engine 122 could select the venue(s) having the greatest estimated demand metric, as the venue that is highest in estimated demand could be considered the best fit for the creative entity in question to perform at.

In one embodiment, the demand calculate engine 122 is configured to calculate an estimated popularity metric for each of the plurality of other entities, based on consumption data for digital audio content corresponding to the respective other entity. That is, while a creative entity's creative works can create demand for performances at venues on their own merits, the creative entity's popularity (e.g., generally, within a geographic region, etc.) can also greatly influence the demand for performances. In such an embodiment, the machine learning model 215 could accept an input popularity metric, and the machine learning model 215 could be trained based on the calculated estimated popularity metrics for the plurality of other entities. Subsequent to creating a digital order reserving the first venue for the first creative entity, the demand calculate engine 122 could receive attendance data corresponding to a performance by the first creative entity at the first venue and could refine the machine learning model, based on a comparison of the estimated demand metric to the received attendance data.

Figure 3A:
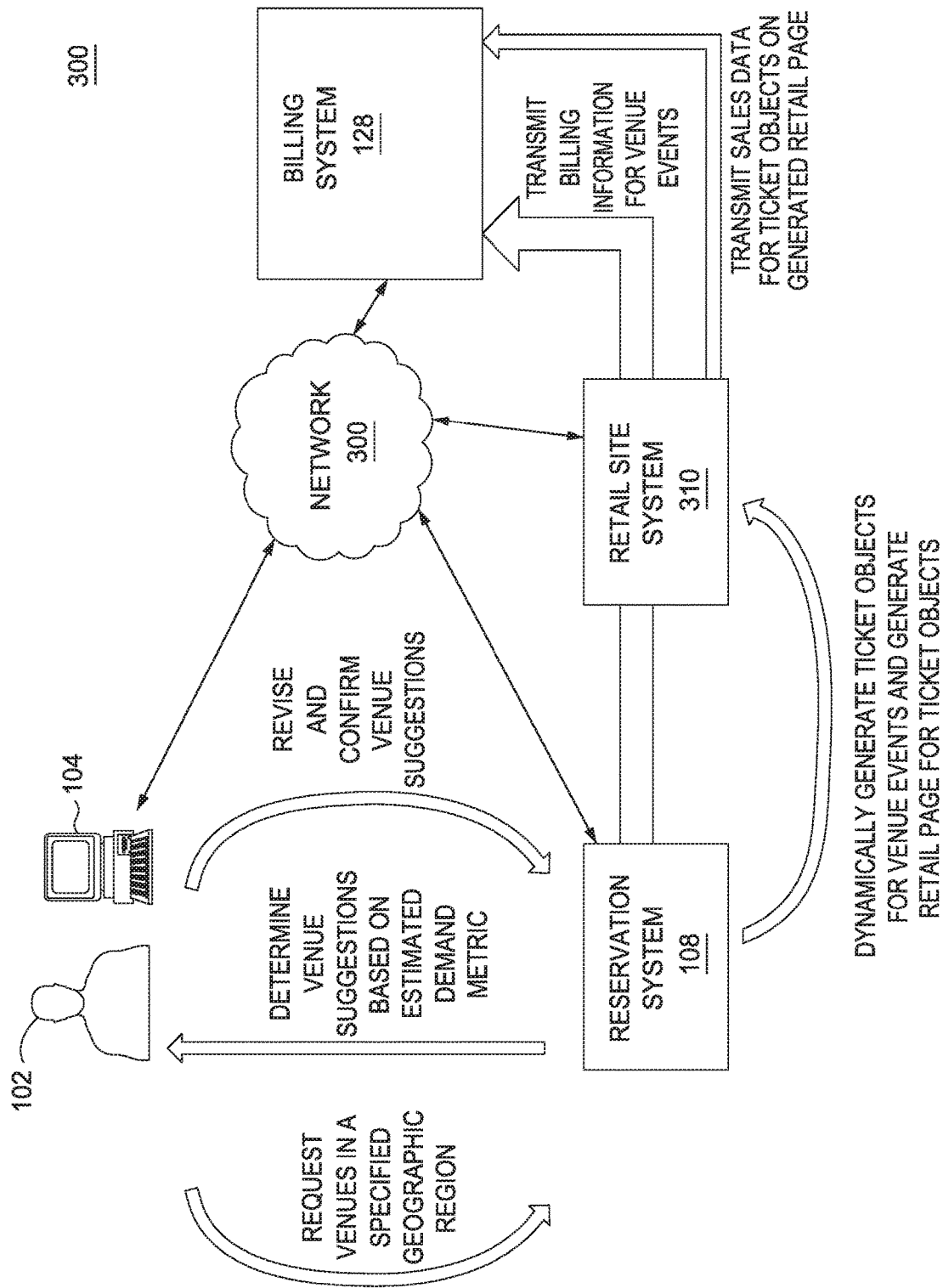
FIGS. 3A-B illustrate workflows for managing a relationship between a creative entity and one or more venues, according to one embodiment described herein.

FIG. 3 illustrates a workflow for managing a relationship between a creative entity and one or more venues, according to one embodiment described herein. As shown, the workflow 300 begins where the user 102, via the client device 104, interacts with the reservation system 108. More specifically, the client device 104 requests venues within a specified geographic region from the reservation system 108. For example, the user 102 could interact with a graphical user interface displayed on the client device 104 to specify the geographic region(s) of interest, and data identifying the geographic region(s) could be transmitted to the reservation system 108.

The venue selection module 112 on the reservation system 108 can determine a plurality of potential venues within the identified geographic region(s). For example, the venue selection module 112 could generate and issue a query to the venue database 114, specifying the identified geographic region(s). Moreover, the venue selection module 112 could retrieve a creative entity profile corresponding to a creative entity associated with the user 102. As discussed above, such a creative entity profile can specify a plurality of acoustic attributes determined to corresponding to the creative entity. Such acoustic attributes could be manually specified by the user 102 and/or could be dynamically determined based on an analysis of digital audio content provided by the user 102. Additionally, the creative entity profile could specify additional data describing the creative entity, such as a measure of popularity for the creative entity. For example, such a measure of popularity could be determined based on streaming consumption of music by the creative entity on an online streaming music service, purchases of music by the creative entity on an online music retail service, purchases of merchandise associated with the creative entity at an online retailer, and so on. More generally, any technique for estimating the popularity of a creative entity can be used, consistent with the functionality described herein.

The demand calculation engine 122 could then use creative entity profile to evaluate each of the retrieved potential venues within the geographic region(s) of interest. In one embodiment, the demand calculation engine 122 is configured to process data associated with the creative entity profile and data associated with a particular venue as inputs to the machine learning model 215, which is configured to output a corresponding estimated demand metric. The estimated demand metrics for the potential venues could then be evaluated (e.g., relative to one another, relative to a predefined threshold level of demand, etc.) to select one or more venues to suggest to the user 102. In the depicted embodiment, the reservation system 108 returns the venue suggestions determined based on the estimated demand metrics to the client device 104.

The user 102 can then interact with the UI 240 of the client device 104 to revise and confirm the venue suggestions provided by the reservation system 108, and at least indications of these revisions (if any) and confirmation are transmitted from the client device 104 to the reservation system 108. During this process, the user 102 can be asked to complete an order for the proposed itinerary using the UI 240 of the client device 104. In doing so, the user 102 may be asked to agree with a designated financing arrangement for the itinerary, and any necessary payment by the user can be received and processed.

In a particular embodiment, the reservation system 108 may allow the user to complete a reservation at a particular venue for a given date and time without an upfront fee (or at a reduced fee), contingent on a threshold level of tickets to the event at the particular venue on the given date and time being sold by a specified deadline. For example, the reservation system 108 could allow the user to reserve a particular venue for a given day and time that is 3 months in the future, contingent on 80% of the tickets to the event being sold within the next 2 months. Continuing the example, at the 2 month deadline, the reservation system 108 could determine that a first number of tickets have been purchased through the dynamically generated product page and, upon determining that the first number of tickets does not exceed a predefined threshold number of tickets, the reservation system 108 could invalidate, within a ticket data repository, one or more tickets purchased using the dynamically generated product page and could cancel the created digital order. In addition, the reservation system 108 could generate automated emails to the purchasers of these tickets, notifying them that the event has been cancelled.

On the other hand, if the reservation system 108 determines that the first number of tickets exceeds a predefined threshold number of tickets, the reservation system 108 could finalize the reservation and allow the event to continue. Once the event has completed successfully, the reservation system 108 could calculate a first amount, based on sales of a plurality of tickets and ticket pricing information at the first venue for the determined date and time and could credit an account corresponding to the first creative entity based on the calculated first amount.

In one embodiment, once a reservation is finalized (e.g., due to a user depositing money for the reservation upfront, due to ticket sales for the event exceeding a threshold level of sales by a deadline date, etc.), the reservation system 108 can perform a number of automated marketing services for the event. Such services can include, for example, automatically generated emails to users who may be interested in the event and have subscribed to one or more mailing lists, social media sites, incorporating dynamically generated advertisements into streaming audio and streaming video services, incorporating knowledge of the event into the knowledge base of a digital assistant, and so on. In a particular embodiment, the reservation system 108 may perform some or all of the services to a limited extent prior to the ticket sales for the event exceeding the threshold level of sales, and once the event is finalized, the reservation system 108 may perform the services to a greater extent.

Returning to the depicted embodiment, once the reservation system 108 receives any revisions and the confirmation of the proposed itinerary, the reservation system 108 instructs a retail site system 310 dynamically generates ticket objects for the events at the selected venues and generates retail pages for the ticket objects. In doing so, the reservation system 108 may provide information describing the event, the venue, the creative entity and so on to the retail site system 310 for use in generating the ticket objects and their corresponding retail pages. Generally, the ticket objects represent uniquely identifiable logical objects within a product catalog of the retail site system 310. In this manner, the retail site system 310 can track which tickets have been sold, who has purchased the various tickets, and so on.

Figure 3B:
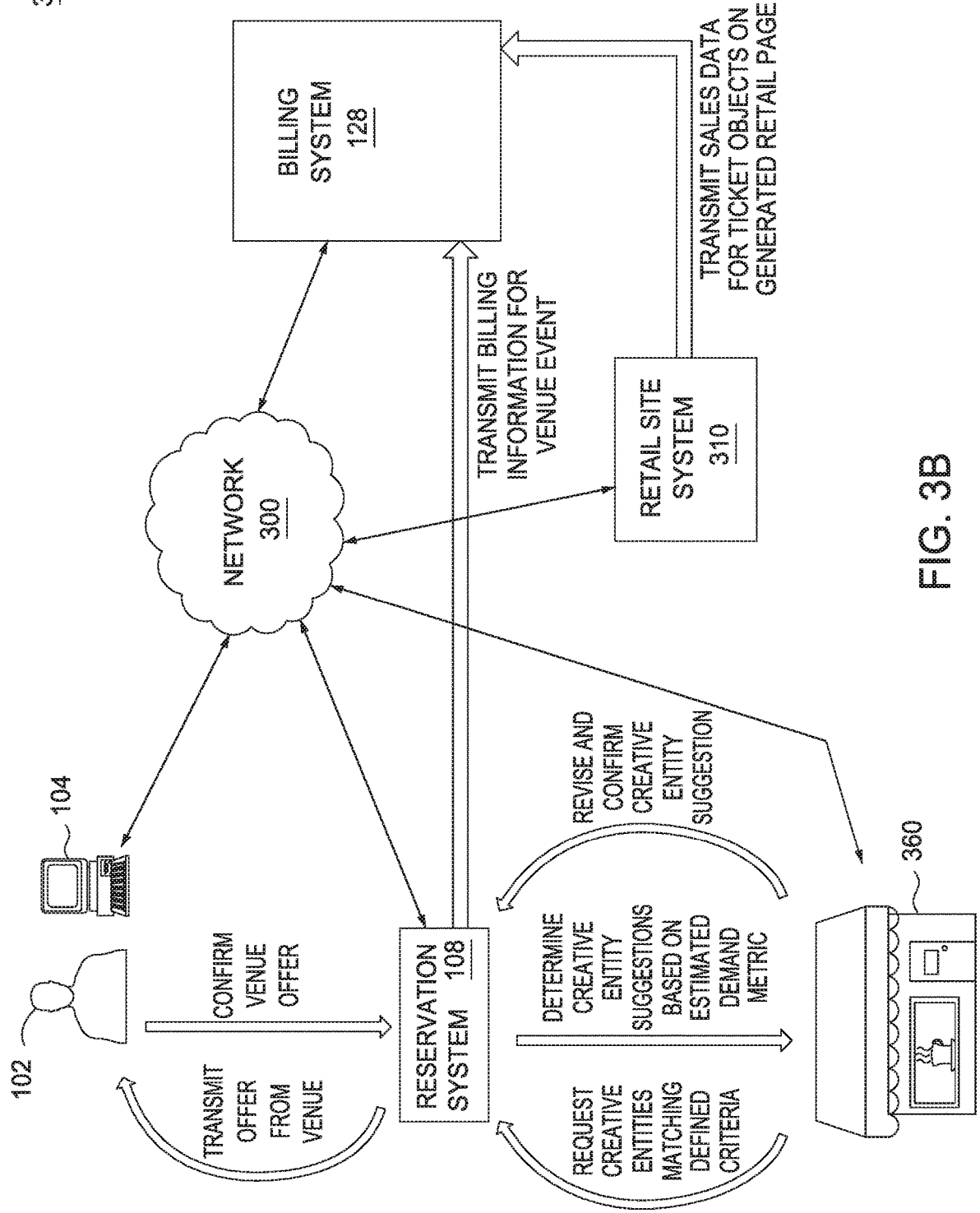

In one embodiment, a venue can initiate the process of finding a creative entity that would be suitable for performing at the venue. An example of such an embodiment is illustrated in FIG. 3B, which illustrates a workflow for managing a relationship between a creative entity and one or more venues, according to one embodiment described herein. As shown, the workflow 350 illustrates that a user corresponding to a venue 360 can request, using a client device, a listing of creative entities matching defined criteria from the reservation system 108. For example, the client device could transmit a request specifying a desired performance date and the reservation system 108 could determine one or more creative entities to suggest for the performance date, based on an estimated demand metric for each of the one or more creative entities. In calculating the estimated demand metric, the reservation system 108 can consider, without limitation, acoustic attributes of digital audio data associated with the creative entities, metadata describing the creative entities, historical performances at the venue 360, acoustic attributes and/or metadata associated with other creative entities that have historically performed at the venue 360, and so on. The user associated with the venue 360 can, using the client device, revise and confirm the creative entity suggestion received from the reservation system 108.

The reservation system 108 can then transmit an offer from the venue to a user associated with a particular creative entity 102. For example, such an offer can specify the desired performance date as well as a fee arrangement corresponding to the performance. For example, the reservation system 108 could transmit data indicating how proceeds from ticket sales for the performance and merchandise sales at the performance will be shared between the creative entity 102 and the venue 360. In one embodiment, the venue 360 can agree to pay the creative entity 102 a fixed amount for the performance, and in exchange the venue 360 can keep all proceeds from the ticket sales for the performance. More generally, however, any fee sharing arrangement can be used, consistent with the functionality described herein.

Once the creative entity 102 confirms, using the client device 104, the venue's offer, the reservation system 108 transmits billing information for the venue event to a billing system 128. For example, such information can describe the agreed upon profit sharing arrangement between the creative entity 102 and the venue. Additionally, the reservation system 108 can transmit information describing the scheduled performance by the creative entity 102 at the venue 360 on the desired performance date to the retail site system 310. Such information can also specify a price for the performance that was agreed upon by the venue 360 and the creative entity 102. The retail site system 310, in turn, can create ticket objects corresponding to the performance on the desired performance date and can dynamically generate a retail page through which the ticket objects can be sold at the agreed upon price. As tickets are sold (or, for example, as a batch operation at some future point in time or after some predefined number of tickets are sold), the retail site system 310 can transmit ticket sales data for the ticket objects on the generated retail page to the billing system 128. The billing system 128 can then take this information into account in allocating the proceeds of the performance between the creative entity 102 and the venue 360 according to the agreed upon profit sharing arrangement.

Figure 4:
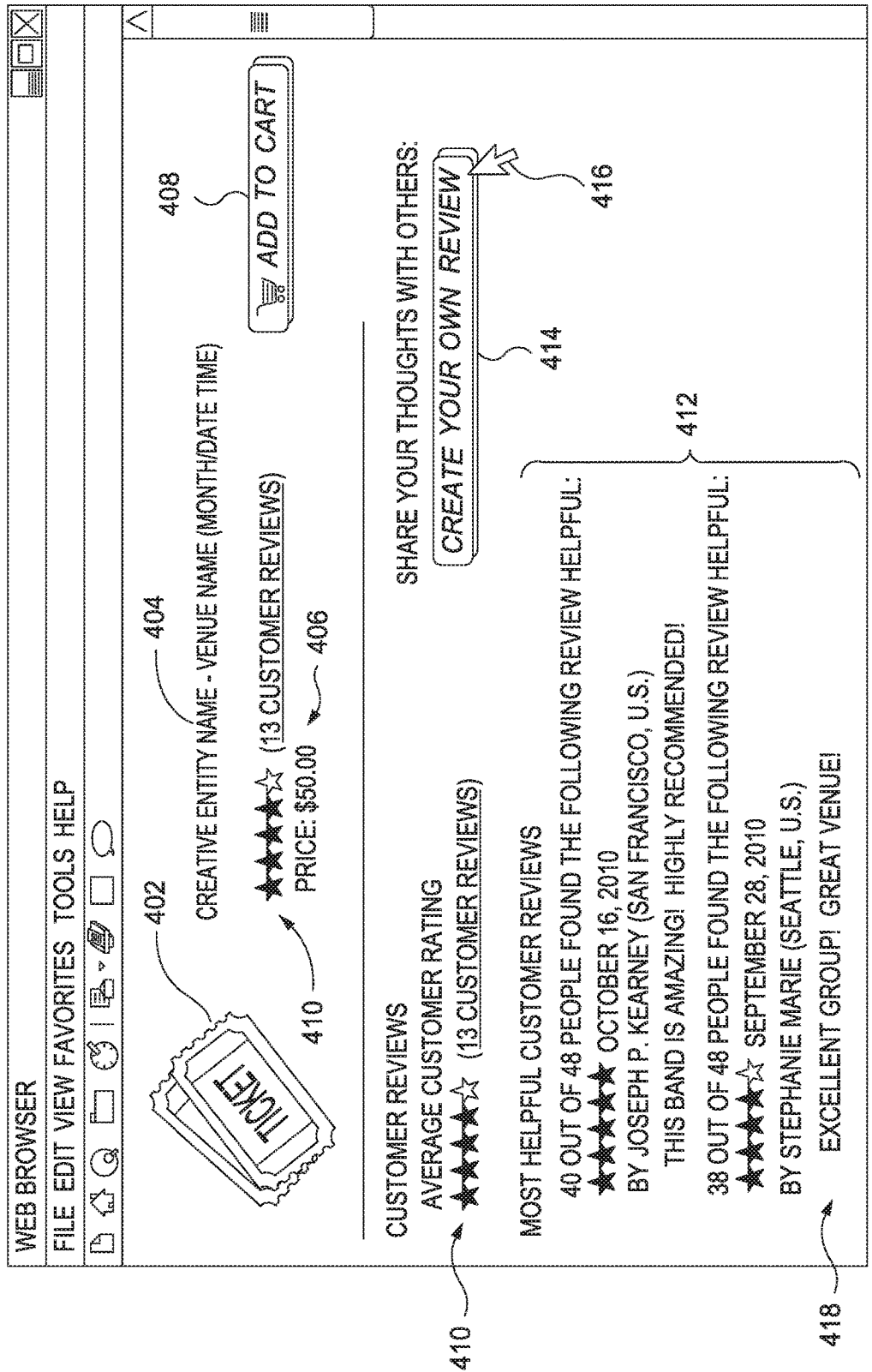
FIG. 4 is a screenshot of a graphical user interface of a product page for a dynamically created ticket retail object, according to one embodiment described herein.

In one embodiment, the retail pages represent web pages or other web resources that, when rendered by a client device 104, display a UI 240 for viewing information about the event and for purchasing a ticket(s) to the event. An example of such a user interface is shown in FIG. 4 is a screenshot of a graphical user interface of a product page for a dynamically created ticket retail object, according to one embodiment described herein.

In one embodiment, the user interface 400 is generated by the client application executing on the client computer 104 in response to a user 102 browsing to a web page for a particular product offered for sale by or on behalf of the online merchant that operates the reservation system 108. In the example shown, the user 102 has browsed to a web page for tickets to see the creative entity "CREATIVE ENTITY NAME" at the venue "VENUE NAME", on the date and time represented by "MONTH/DATE TIME". Of course, such an example interface is provided for illustrative purposes and without limitation, and more generally any graphical user interface can be used for the generated retail pages, consistent with the functionality described herein.

As shown, the user interface 400 includes product details for a product including a product image 402, a product identifier 404, and a price 406 per ticket. Other types of product details might also be provided in other embodiments, such as a detailed description of the creative entity, a list of popular songs by the creative entity, links to samples of such songs, and indications of other creative entities the reservation system 108 has determined are similar to the creative entity. The user interface 400 also includes a mechanism for initiating a purchase of the product. In this example, a user interface control 408 is provided for adding the product to an e-commerce shopping cart. The shopping cart is utilized to hold items until a user is ready to check out. Other mechanisms for allowing a user to purchase a product might also be utilized, such as a one-click mechanism for allowing a user to purchase the product using only a single action.

The user interface 400 might also include information indicating how other customers have reviewed the product. For instance, the example user interface 400 includes an indicator 410 representing an average quantitative rating of the product along with the text 412 of one or more product reviews 418. The text 412 shows the date each product review 418 was made, information regarding the respective reviewer, and all or a portion of the text of the product review 418 provided by the reviewer. An indicator might also be displayed for each product review 418 showing the quantitative rating assigned to the product by each reviewer. Other information might also be displayed. The user interface 400 shown in FIG. 2 might also include a mechanism for initiating a process for creating a new review of the product. In the example shown, a user interface button 414 has been provided which, when selected, such as by placing a mouse cursor 416 on the button 414 and making an appropriate selection with an input device, will cause a process for creating a new review of the product to be started.

As discussed above, the reservation system 108 can instruct the retail site system 310 to dynamically generate the user interface 400 for a given venue, and can provide information to use in populating the user interface 400. For example, the retail site system 310 could be configured with one or more template structures for generating retail pages for the sale of tickets, and the retail site system 310 could use the information provided by the reservation system 108 to populate the template structure and to generate the retail page. The retail site system 310 could then store the generated retail page, such that the retail page is incorporated into an online retail service. The retail site system 310 could perform additional actions to incorporate the newly generated retail page, such as updating a search engine used by the online retail service to recognize queries relating to the newly created ticket objects and to direct such queries to the newly generated retail page for the sale of the tickets (e.g., the newly generated retail page could be return in a set of query results by the search engine).

In a particular embodiment, the retail site system 310 can restrict access to the newly generated retail page to a certain group of users. For example, the retail site system 310 could offer the tickets through the generated retail page to a certain group of users who subscribe to a premium service on the retail site. In one embodiment, the retail site system 310 is configured to limit who can purchase the tickets for a defined period of time (e.g., where only the certain group of users who subscribe to the premium service on the retail site can purchase tickets during a pre-sale window of time), and after the defined period of time has elapsed, the retail site system 310 can make the tickets available for general consumption.

Figure 5:
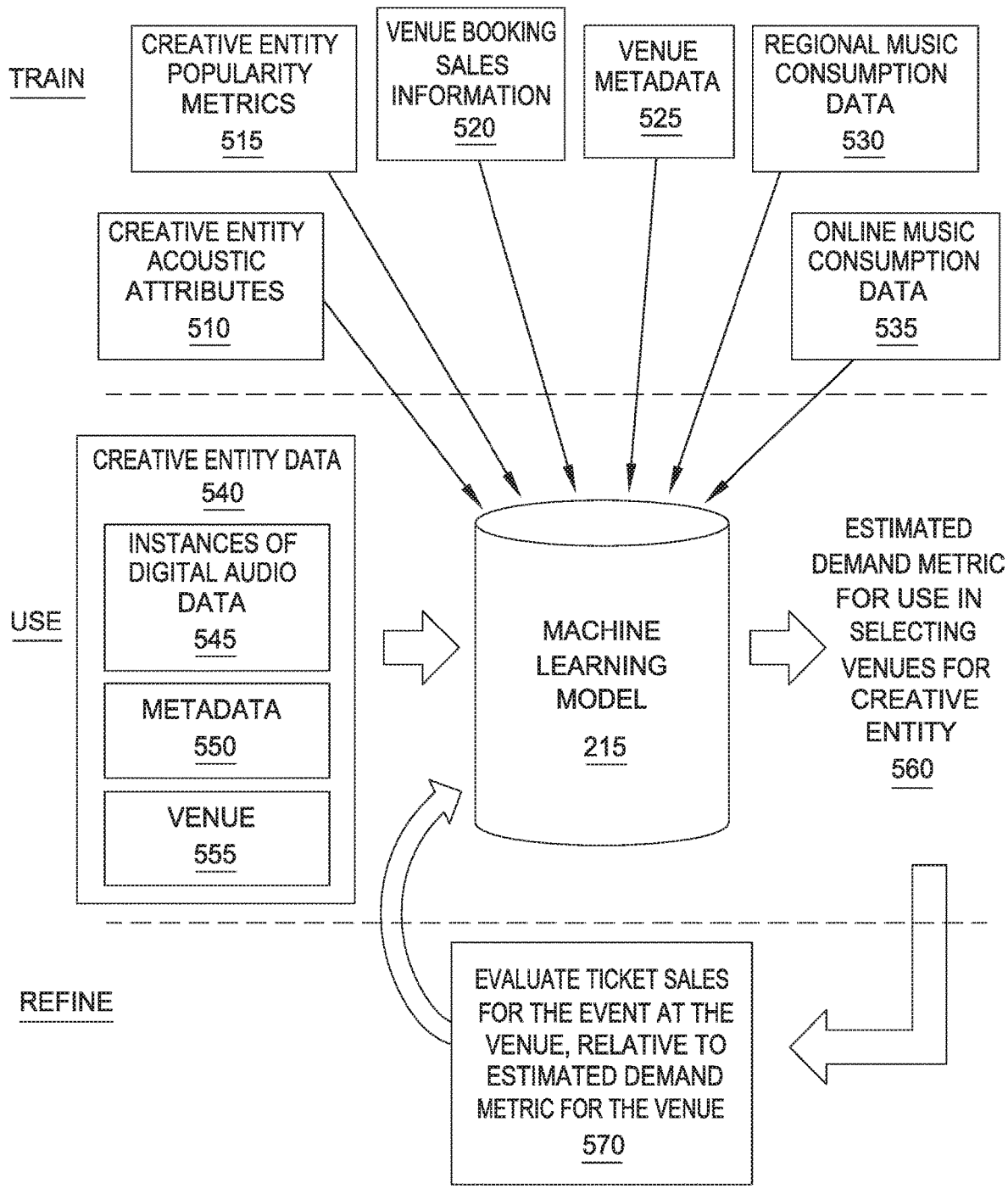
FIG. 5 is a block diagram illustrating a workflow for training, using and refining a machine learning model for generating estimated demand metrics for venues and creative entities, according to one embodiment described herein.

FIG. 5 is a block diagram illustrating a workflow for training, using and refining a machine learning model for generating estimated demand metrics for venues and creative entities, according to one embodiment described herein. As shown, the workflow 500 illustrates a number of different pieces of information being considered during a training phase for the machine learning model 215. In the depicted embodiment, creative entity acoustic attributes 510, creative entity popularity metrics 515, venue booking sales information 520, venue metadata 525, regional music consumption data 530 and online music consumption data 535 are processed and used as inputs to train the machine learning model 215. Generally, the depicted embodiment illustrates a supervised learning approach for training the machine learning model 215. More generally, however, any suitable machine learning model and training mechanism can be used, consistent with the functionality described herein.

Once the machine learning model 215 has been trained, creative entity data 540 can be fed into the machine learning model 215 as an input and the machine learning model 215 can output an estimated demand metric 560 for use in selecting venues for the creative entity. In the depicted embodiment, the creative entity data 540 includes instances of digital audio data 545, metadata 550 describing the creative entity and their creative works, and a particular venue 555. Of note, although these data sources are illustrated as going directly into the machine learning model 215, one of ordinary skill in the art will appreciate that these pieces of information can be processed in a variety of ways before any input data is fed into the machine learning model 215. As an example, the venue selection module 112 could analyze the instances of digital audio data 545 and could generate vector data that specifies an attribute value for each of a plurality of predefined acoustic attributes that describes, in the aggregate, acoustic characteristics of the instances of digital audio data 545. In such an example, the resulting vector data could be fed into the machine learning model 215, rather than the audio data itself.

Over time, the demand calculation engine 122 can refine the machine learning model 215 to improve the performance of the reservation system 108. In the depicted embodiment, the demand calculation engine 122 can evaluate ticket sales for the event in question at the particular venue, relative to the estimated demand metric for the venue produced by the machine learning model 215 (block 570). If the demand calculation engine 122 determines that the actual demand for tickets exceeded the estimated demand metric, the demand calculation engine 122 could modify one or more weights within the machine learning model 215 to increase the estimated demand metric when subsequently considering similar or identical inputs. Likewise, if the demand calculation engine 122 determines that the actual demand for tickets was less than the estimated demand metric, the demand calculation engine 122 could modify one or more weights within the machine learning model 215 to decrease the estimated demand metric when subsequently considering similar or identical inputs.

In one embodiment, a machine learning model is trained and used to determine which users are ideal to advertise the performance to. In training such a machine learning model, embodiments can consider a variety of information, including the users' shopping history, items browsed by the users on a retail site, past performances the users have purchased tickets to through the retail site, music the users have consumed (e.g., through streaming sources, through retail sources, etc.), and so on. Additionally, embodiments can consider interactions between the users and a digital assistant service in training and using the machine learning model.

Figure 6:
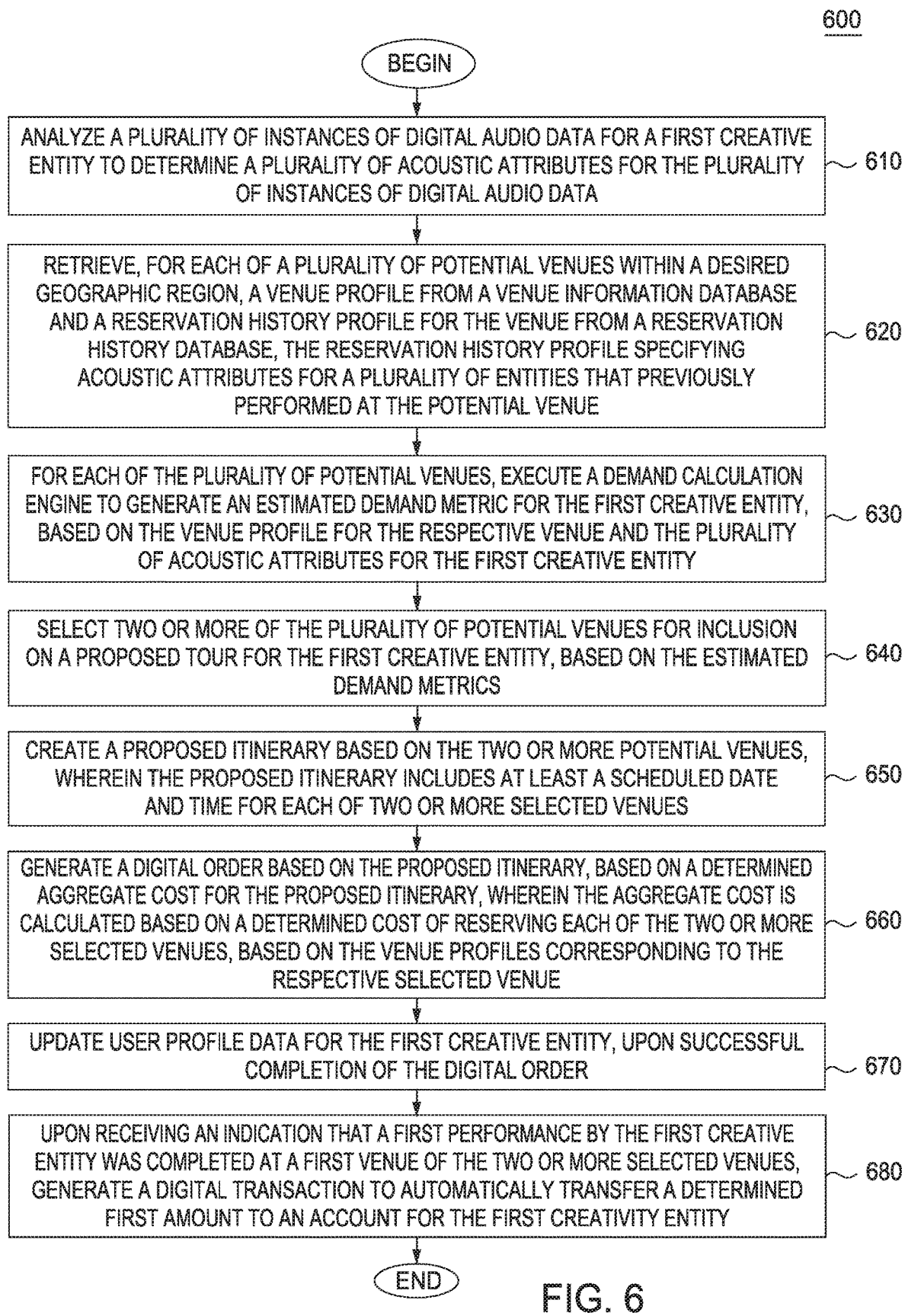
FIG. 6 is a flow diagram illustrating a method for creating and managing a digital transaction between a creative entity and a venue, according to one embodiment described herein.

FIG. 6 is a flow diagram illustrating a method for creating and managing a digital transaction between a creative entity and a venue, according to one embodiment described herein. As shown, the method 600 begins at block 610, where the venue selection module 112 analyzes a plurality of instances of digital audio data for a first creative entity to determine a plurality of acoustic attributes for the plurality of instances of digital audio data. For example, such acoustic attributes could include high-level characterizations of the instances of digital audio data (e.g., genre, category tags, instrument tags, etc.) as well as more specific acoustic metrics, such as tempo, time signature, key, song structure and so on.

The venue selection module 112 could retrieve, from a venue information database 114, a venue profile for each of a plurality of potential venues within a desired geographic region, and could retrieve, from a reservation history database 116, a reservation history profile for each potential venue (block 620). For example, the venue profile could specify attributes describing the venue, such as the venue capacity, a type of the business, acoustic attributes for a plurality of entities that previously performed at the potential venue. For each of the plurality of potential venues, the venue selection module 112 can execute a demand calculation engine 122 to generate an estimated demand metric for the first creative entity, based on the venue profile for the respective venue and the plurality of acoustic attributes for the first creative entity (block 630).

The venue selection module 112 then selects two or more of the plurality of potential venues for inclusion on a proposed tour for the first creative entity, based on the estimated demand metrics (block 640). The venue selection module 112 creates a proposed itinerary based on the two or more potential venues, wherein the proposed itinerary includes at least a scheduled date and time for each of two or more selected venues (block 650). Additionally, the venue selection module 112 generates a digital order based on the proposed itinerary, based on a determined aggregate cost for the proposed itinerary, wherein the aggregate cost is calculated based on a determined cost of reserving each of the two or more selected venues, based on the venue profiles corresponding to the respective selected venue (block 660). The venue selection module 112 updates user profile data for the first creative entity, upon successful completion of the digital order (block 670) and, upon receiving an indication that a first performance by the first creative entity was completed at a first venue of the two or more selected venues, generating a digital transaction to automatically transfer a determined first amount to an account for the first creative entity (block 680), and the method 600 ends.

FIG. 7 is a flow diagram illustrating a method for using a machine learning model to calculate an estimated demand metric for a creative entity and a venue, according to one embodiment described herein. As shown, the method 700 begins at block 116, where the venue selection module 112 generates an entity profile for a first creative entity, based on a plurality of acoustic attributes determined by analyzing a plurality of instances of digital audio data corresponding to the first creative entity. A demand calculation engine 122 then trains a machine learning model 215 using data specifying attributes of a plurality of historical venue bookings by a plurality of other entities (block 720). In the depicted embodiment, at least one of the plurality of historical venue bookings specifies a second plurality of acoustic attributes for one of the other entities and a historical demand metric at a first venue, wherein the trained machine learning model is configured to output an estimated demand metric for an input entity and an input venue.

The demand calculation engine 122 calculates, using the trained machine learning model 215, an estimated demand metric for the first creative entity for a first venue, based on the entity profile for the first creative entity and a first venue profile corresponding to the first venue (block 730). In alternate embodiments, the machine learning model 215 can also accept additional inputs, such as (without limitation) a measure of popularity of the first creative entity, regional music consumption patterns determined by monitoring streaming music services to devices within the region including the first venue, general online music consumption patterns (e.g., macro patterns that are not limited to the region), metadata describing the first creative entity, metadata describing the first venue, and so on. More generally, the various inputs that the machine learning model 215 is trained to accept can vary across different embodiments, e.g., depending on the specific implementation and/or the information available to the demand calculation engine 122.

The venue selection module 112 creates a digital transaction between the first creative entity and the first venue (block 740), and the method 700 ends. For example, such a digital transaction can require an initial payment from the first entity to reserve the first venue, and can automatically instruct a billing system 108 to charge an account for the first creative entity a determined amount (e.g., a predefined amount specified by the first venue). Of course, the determined amount can vary depending across embodiments and across venues, and more generally any suitable billing structure can be used, consistent with the functionality described herein.

Figure 8:
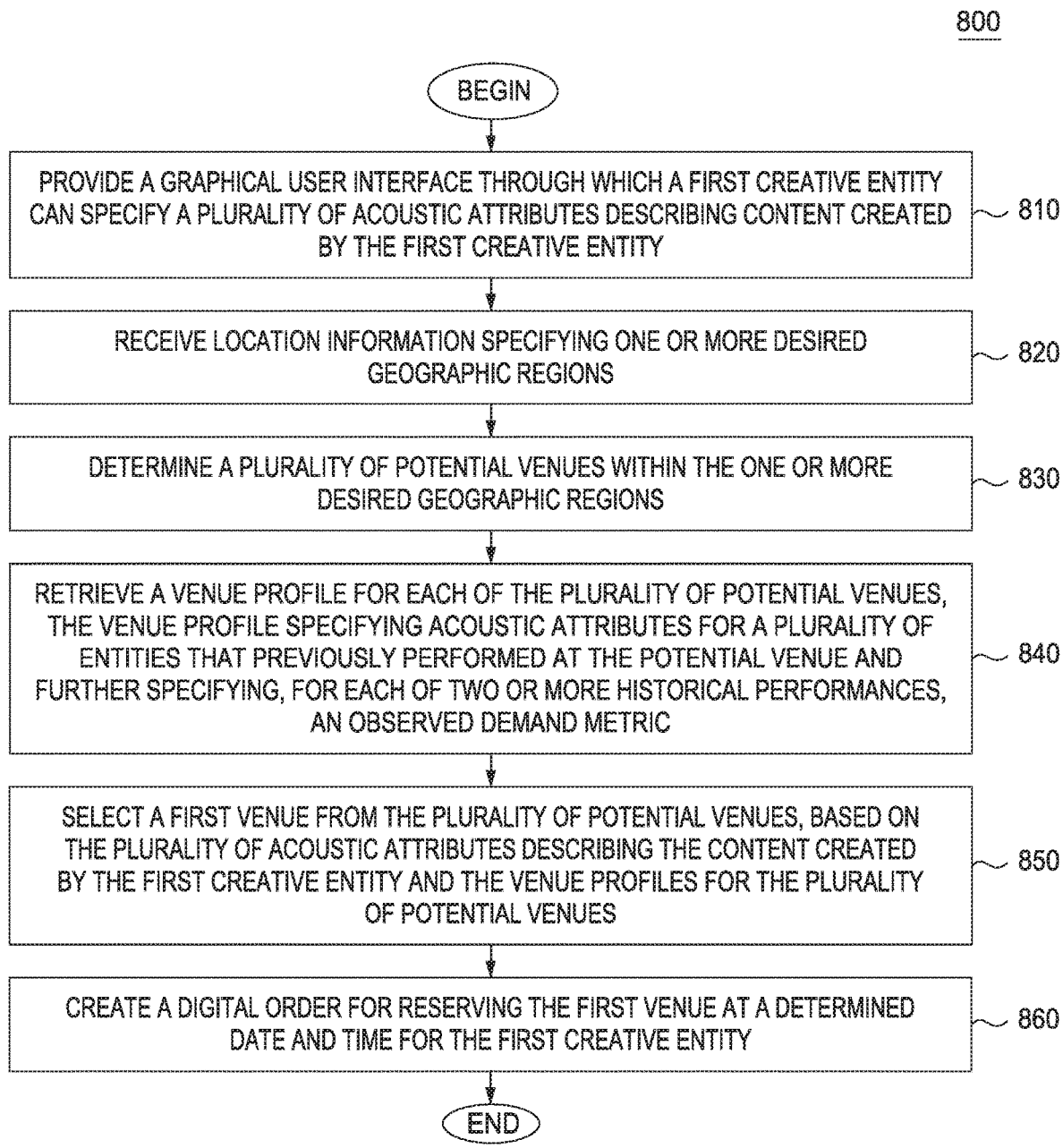
FIG. 8 is a flow diagram illustrating a method for creating a digital order between a creative entity and a venue that is selected based on acoustic attributes of a creative entity, according to one embodiment described herein.

FIG. 8 is a flow diagram illustrating a method for creating a digital order between a creative entity and a venue that is selected based on acoustic attributes of a creative entity, according to one embodiment described herein. As shown, the method 800 begins at block 810, where the venue selection module 112 provides a graphical user interface through which a first creative entity can specify a plurality of acoustic attributes describing content created by the first creative entity. For example, such a graphical user interface could provide an interface (e.g., a series of checkboxes, a drop-down list, etc.) through which client devices can specify acoustic attributes associated with the first creative entity (e.g., attributes which describe digital audio data created by the first creative entity, attributes which describe digital audio data created by recording a performance by the first creative entity, and so on). In one embodiment, the graphical user interface comprises a web page(s) or another web entity that is hosted by a web server (and/or a web application server). In such an embodiment, a client device 104 can view the web page(s) using a web browser executing on the client device 104, and can interact with the graphical user interface using one or more input/output devices of the client devices 104. Data relating to these interactions can then be transmitted to the venue selection module 112 using a data communications network.

In one embodiment, the graphical user interface provides an interface through which a client device 104 can identify other creative entities that are considered to be similar to the first creative entity. For example, if the first creative entity is a group of hard rock musicians, such an interface could be used to identify other groups and solo musicians that play similar music. The venue selection module 112 could then retrieve acoustic attributes corresponding to the other creative entities and could aggregate these acoustic attributes for use in describing the first creative entity.

The venue selection module 112 receives location information specifying one or more desired geographic regions (block 820). For example, the venue selection module 112 could provide a graphical user interface (e.g., one or more web pages or web resources hosted by a web server and/or web application server) through which the desired geographic region(s) could be specified. The venue selection module 112 then determines a plurality of potential venues within the one or more desired geographic regions (block 830). For example, the venue selection module 112 could query the venue database 114 using the desired geographic region(s) to identify venues that are known to be located within the geographic region. In one embodiment, the venue selection module 112 can only retrieve information for venues that have registered with the venue selection module 112. For example, the venue selection module 112 could generate a query for the venue database 114 that is configured to retrieve a listing of venues and corresponding venue information (e.g., a measure of occupant capacity of the venue, operating hours of the venue, a location of the venue, etc.) that are registered with the venue selection module 112 and have accounts in good standing with the venue selection module 112.

The venue selection module 112 further retrieves a reservation history profile for each of the plurality of potential venues, the reservation history profile specifying acoustic attributes for a plurality of entities that previously performed at the potential venue and further specifying, for each of two or more historical performances, an observed demand metric (block 840). The venue selection module 112 selects a first venue from the plurality of potential venues, based on the plurality of acoustic attributes describing the content created by the first creative entity and the venue profiles for the plurality of potential venues (block 850). For example, the venue selection module 112 could process data associated with the first creative entity (e.g., acoustic attributes, measures of popularity, an associated musical genre, etc.) as well as data associated with the first venue using a demand calculation engine 122, in order to calculate an estimated demand metric for the first venue. The venue selection module 112 could perform a similar operation for the other retrieved venues, and could select the first venue as the venue having the highest estimated demand metric. The venue selection module 112 could then create a digital order for reserving the first venue at a determined date and time for the first creative entity (block 860), and the method 800 ends.

The descriptions of the various embodiments of the present invention are presented herein for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the present disclosure, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the described aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the venue selection module 112 or related data available in the cloud. For example, the venue selection module 112 could execute on an application server(s) 110 deployed on a computing system in the cloud and could determine venues that are well-suited for a creative entity, based on estimated demand metrics calculated by a demand calculation engine 122 executing on a computing system within the cloud. Upon receiving a confirmation of at least one of the determined venues from a client device 104, the venue selection module 112 could instruct a retail site module 220 (e.g., also executing on a computing system within the cloud) to generate a retail object corresponding to tickets for an event for the creative entity at the at least one venue at a specified date and time. The retail site module 220 could further generate product pages 222 corresponding to the retail object and store these product pages 222 at a storage location in the cloud (e.g., to be hosted on a web server or web application server). Doing so allows a user to access this service from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium containing computer program code that, when executed by operation of one or more computer processors, performs an operation, comprising:
   generating an entity profile for a first creative entity, based on a first plurality of acoustic attributes determined by analyzing a plurality of instances of digital audio data corresponding to the first creative entity;
   training a machine learning model using data specifying attributes of a plurality of historical venue bookings by a plurality of other entities and first estimated popularity metrics for the plurality of other entities, wherein:
   each first estimated popularity metric for a respective other entity is determined based on consumption data for digital audio content corresponding to the respective other entity; and
   the attributes of at least one of the plurality of historical venue bookings specifies a second plurality of acoustic attributes for one of the other entities and a historical demand metric at a first venue;
   calculating, using the entity profile for the first creative entity, a first venue profile corresponding to the first venue, and a second estimated popularity metric associated with the first creative entity as inputs to the trained machine learning model, an estimated demand metric for the first creative entity for the first venue;
   creating a digital transaction between the first creative entity and the first venue; and
   refining the machine learning model based on a comparison of the estimated demand metric to attendance data corresponding to a performance by the first creative entity at the first venue, wherein refining the machine learning model comprises modifying one or more weights of the machine learning model to adjust the estimated demand metric output from the machine learning model for subsequent inputs to the trained machine learning model.

2. The non-transitory computer-readable medium of claim 1, wherein creating the digital transaction between the first creative entity and the first venue comprises:
   generating a digital order, based on a determined cost for reserving the first venue determined based on the first venue profile; and
   updating user profile data for the first creative entity, upon successful completion of the digital order.

3. The non-transitory computer-readable medium of claim 2, wherein creating the digital transaction between the first creative entity and the first venue further comprises:
   receiving an indication that a first performance by the first creative entity was completed at the First venue; and
   automatically generating a digital transaction to charge a determined first amount to a digital account for the first venue and to transfer a determined second amount to a digital account for the first creative entity.

4. The non-transitory computer-readable medium of claim 1, the operation further comprising:
   evaluating a plurality of geographic regions, each containing a respective plurality of venues, using the machine learning model, to determine a respective estimated aggregate demand metric for each of the plurality of geographic regions;
   selecting one or more of the plurality of geographic regions to recommend to the first creative entity, based on the estimated aggregate demand metrics; and
   generating a graphical user interface that includes at least an indication of the selected one or more geographic regions.

5. The non-transitory computer-readable medium of claim 4, wherein generating the graphical user interface comprises generating a visual representation of at least a portion of the first plurality of acoustic attributes corresponding to the first creative entity and a second plurality of acoustic attributes corresponding to a plurality of entities that have historically performed at venues within the one or more geographic regions.

6. The non-transitory computer-readable medium of claim 1, wherein refining the machine learning model comprises:
   modifying the one or more weights to decrease the estimated demand metric; or
   modifying the one or more weights to increase the estimated demand metric.

7. The non-transitory computer-readable medium of claim 1, the operation further comprising:
   receiving online consumption data for the plurality of instances of digital audio data corresponding to the first creative entity; and
   determining the estimated popularity metric for the first creative entity, based on the online consumption data.

8. A computer-implemented method comprising:
   generating an entity profile for a first creative entity, based on a first plurality of acoustic attributes determined by analyzing a plurality of instances of digital audio data corresponding to the first creative entity;
   training a machine learning model using data specifying attributes of a plurality of historical venue bookings by a plurality of other entities and first estimated popularity metrics for the plurality of other entities, wherein:
   each first estimated popularity metric for a respective other entity is determined based on consumption data for digital audio content corresponding to the respective other entity; and
   the attributes of at least one of the plurality of historical venue bookings specifies a second plurality of acoustic attributes for one of the other entities and a historical demand metric at a first venue;

calculating, using the entity profile for the first creative entity, a first venue profile corresponding to the first venue, and a second estimated popularity metric associated with the first creative entity as inputs to the trained machine learning model, an estimated demand metric for the first creative entity for the first venue;

creating a digital transaction between the first creative entity and the first venue; and refining the machine learning model based on a comparison of the estimated demand metric to attendance data corresponding to a performance by the first creative entity at the first venue, wherein refining the machine learning model comprises modifying one or more weights of the machine learning model to adjust the estimated demand metric output from the machine learning model for subsequent inputs to the trained machine learning model.

9. The computer-implemented method of claim 8, wherein creating the digital transaction between the first creative entity and the first venue comprises:

generating a digital order, based on a determined cost for reserving the first venue determined based on the first venue profile; and updating user profile data for the first creative entity, upon successful completion of the digital order.

10. The computer-implemented method of claim 9, wherein creating the digital transaction between the first creative entity and the first venue further comprises:

receiving an indication that a first performance by the first creative entity was completed at the first venue; and automatically generating a digital transaction to charge a determined first amount to a digital account for the first venue and to transfer a determined second amount to a digital account for the first creative entity.

11. The computer-implemented method of claim 8, further comprising:

evaluating a plurality of geographic regions, each containing a respective plurality of venues, using the machine learning model, to determine a respective estimated aggregate demand metric for each of the plurality of geographic regions;

selecting one or more of the plurality of geographic regions to recommend to the first creative entity, based on the estimated aggregate demand metrics; and generating a graphical user interface that includes at least an indication of the selected one or more geographic regions.

12. The computer-implemented method of claim 11, wherein generating the graphical user-interface comprises generating a visual representation of at least a portion of the first plurality of acoustic attributes corresponding to the first creative entity and a second plurality of acoustic attributes corresponding to a plurality of entities that have historically performed at venues within the one or more geographic regions.

13. The computer-implemented method of claim 8, wherein refining the machine learning model comprises:

modifying the one or more weights to decrease the estimated demand metric; or modifying the one or more weights to increase the estimated demand metric.

14. The computer-implemented method of claim 8, further comprising:

receiving online consumption data for the plurality of instances of digital audio data corresponding to the first creative entity; and determining the estimated popularity metric for the first creative entity, based on the online consumption data.

15. A system comprising:

one or more computer processors; and a memory containing computer program code that, when executed by operation of the one or more computer processors, performs an operation comprising:

generating an entity profile for a First creative entity, based on a first plurality of acoustic attributes determined by analyzing a plurality of instances of digital audio data corresponding to the first creative entity;

training a machine learning model using data specifying attributes of a plurality of historical venue bookings by a plurality of other entities and first estimated popularity metrics for the plurality of other entities, wherein:

each first estimated popularity metric for a respective other entity is determined based on consumption data for digital audio content corresponding to the respective other entity; and the attributes of at least one of the plurality of historical venue bookings specifies a second plurality of acoustic attributes for one of the other entities and a historical demand metric at a first venue;

calculating, using the entity profile for the first creative entity, a first venue profile corresponding to the first venue, and a second estimated popularity metric associated with the first creative entity as inputs to the trained machine learning model, an estimated demand metric for the first creative entity for the first venue;

creating a digital transaction between the first creative entity and the first venue; and refining the machine learning model based on a comparison of the estimated demand metric to attendance data corresponding to a performance by the first creative entity at the first venue, wherein refining the machine learning model comprises modifying one or more weights of the machine learning model to adjust the estimated demand metric output from the machine learning model for subsequent inputs to the trained machine learning model.

16. The system of claim 15, wherein creating the digital transaction between the first creative entity and the first venue comprises:

generating a digital order, based on a determined cost for reserving the first venue determined based on the first venue profile; and updating user profile data for the first creative entity, upon successful completion of the digital order.

17. The system of claim 16, wherein creating the digital transaction between the first creative entity and the first venue further comprises:

receiving an indication that a first performance by the first creative entity was completed at the first venue; and automatically generating a digital transaction to charge a determined first amount to a digital account for the first venue and to transfer a determined second amount to a digital account for the first creative entity.

18. The system of claim 15, the operation further comprising:

evaluating a plurality of geographic regions, each containing a respective plurality of venues, using the machine learning model, to determine a respective estimated aggregate demand metric for each of the plurality of geographic regions;

selecting one or more of the plurality of geographic regions to recommend to the first creative entity, based on the estimated aggregate demand metrics; and
generating a graphical user interface that includes at least an indication of the selected one or more geographic regions.

* * * * *

UNITED STATES PATENT AND TRADEMARK OFFICE
CERTIFICATE OF CORRECTION

PATENT NO. : 11,200,515 B1
APPLICATION NO. : 15/927615
DATED : December 14, 2021
INVENTOR(S) : Joseph Hopkins et al.

It is certified that error appears in the above-identified patent and that said Letters Patent is hereby corrected as shown below:

In the Claims

In Column 20, Line 14, in Claim 3, delete "First" and insert -- first --.

In Column 21, Line 53, in Claim 12, delete "user-interface" and insert -- user interface --.

In Column 22, Line 11, in Claim 15, delete "First" and insert -- first --.

Signed and Sealed this
Twenty-first Day of March, 2023

Katherine Kelly Vidal
*Director of the United States Patent and Trademark Office*